United States Patent [19]

Berra

[11] Patent Number: 5,787,367
[45] Date of Patent: Jul. 28, 1998

[54] FLASH REPROGRAMMING SECURITY FOR VEHICLE COMPUTER

[75] Inventor: Charles J. Berra, Troy, Mich.

[73] Assignee: Chrysler Corporation, Auburn Hills, Mich.

[21] Appl. No.: 675,754

[22] Filed: Jul. 3, 1996

[51] Int. Cl.⁶ .............................. H04L 9/32; G06F 12/14
[52] U.S. Cl. ................... 701/1; 701/29; 701/32; 701/35; 380/23; 380/28; 380/49
[58] Field of Search ..................... 701/1, 29, 30, 701/31, 32, 33, 34, 35, 114, 115; 380/23, 25, 28, 30, 44, 49; 365/195; 455/76, 77, 95; 364/551.01

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/49 |
| 4,424,414 | 1/1984 | Hellman et al. | 380/44 |
| 4,751,633 | 6/1988 | Henn et al. | 395/182.16 |
| 4,771,462 | 9/1988 | Hannan et al. | 380/44 |
| 4,875,391 | 10/1989 | Leising et al. | 477/155 |
| 5,278,759 | 1/1994 | Berra et al. | 701/1 |
| 5,406,484 | 4/1995 | Wurzenberger | 701/1 |
| 5,473,540 | 12/1995 | Schmitz | 364/551.01 |

OTHER PUBLICATIONS

Pashley et al., "Flash Memories: The Best of Two Worlds", IEEE Spectrum, Dec. 1989, pp. 30–33.

*Primary Examiner*—Tan Q. Nguyen
*Attorney, Agent, or Firm*—Mark P. Calcaterra

[57] ABSTRACT

A system and method for providing secured programming for reprogramming on-board vehicle computer systems. The system includes an interface tool which communicates with a selected on-board computer system. The communication tool also communicates with an authorized database via a modem. The vehicle computer has a serial identification number and designated passwords stored in memory and external access to the designated passwords is denied. Upon request, the vehicle computer transmits the serial identification number to the database which looks up a designated password A that corresponds to the vehicle computer and transmits password A to the computer. If the password A received by the computer matches the password in memory, the authorized database provides encrypted data in accordance with an encryption function, password B and data values. The computer deciphers the encrypted data in accordance with a stored password B to generate data values. Reprogramming of the control software is allowed only when the encrypted data value match the data values stored in the vehicle computer.

12 Claims, 3 Drawing Sheets

FLASH REPROGRAMMING SECURITY FOR VEHICLE COMPUTER

BACKGROUND OF THE INVENTION

1. Technical Field

The present invention generally relates to programming of on-board vehicle computer systems and, more particularly, to a system and method for providing programming security for reprogramming on-board vehicle computer systems.

2. Discussion

Computers are commonly used on vehicles, such as automobiles, to control designated operations of one or more vehicle systems. In this regard, one of the first and still principle applications of vehicle computer technology has been to control various aspects of the engine used to drive the vehicle. In other applications, computers have also come to be used in a wide variety of vehicle systems such as transmission systems, anti-lock brake systems, suspension systems, operator control panels and even motorized seats. One example of such a computerized vehicle system is described in U.S. Pat. No. 4,875,391, entitled "Electronically-Controlled, Adapted Automatic Transmission System," issued on Oct. 24, 1989 to Leising et al. The aforementioned issued patent is commonly assigned and is hereby incorporated by reference. The above cited patent describes a vehicle transmission system which includes a computer circuit for controlling a plurality of solenoid-actuated valves that regulate the flow of hydraulic fluid within the transmission.

As with any computer system, an on-board vehicle computer requires a set of instructions for the computer hardware to follow. This set of instructions generally includes one or more computer programs which are generally referred to generically as computer software. In order for the computer hardware to use this set of instructions, the computer programs need to be stored in some medium which is readily accessible to the computer's hardware. In terms of on-board vehicle computers, the computer programs are typically stored in the form of circuitry which will retain the computer program even when there is no electrical power supplied to the computer circuit.

On-board vehicle computer programs are typically stored in one or more types of non-volatile read-only memory (ROM). ROM circuits generally come in various types such as permanent circuits (ROM), programmable circuits (PROM), erasable-programmable circuits (EPROM) or electrically-erasable programmable circuits (EEPROM). Each of these ROM circuits are produced in the form of a semiconductor integrated circuit (IC) or circuit chip which may be separately mounted to a circuit board or contained in a larger chip that includes other circuits as well.

With a permanent ROM (PROM), the computer programs are typically hard-wired into the chip during the manufacture of the chip, and the program cannot thereafter be changed. With a PROM, the computer program is electronically inserted or injected into the chip after it has been manufactured. The EPROM is similar to the PROM except the EPROM has the added capability of erasing the entire computer program stored in the chip by irradiating the chip with ultraviolet light for a period of time. Once the program is erased, then another computer program may be inserted into the chip to take its place. The EEPROM is similar to the EPROM in that it permits erasure and subsequent reprogramming. However, with an EEPROM, the entire computer program need not be erased and the erasure may be accomplished very rapidly through the application of electrical signals.

More recently, a form of non-volatile ROM chip, known as "flash memory", has become widely available. A flash memory chip is like an EEPROM in terms of being electrically erasable and reprogrammable. However, unlike the EEPROM, individual memory cells generally cannot be erased in a flash memory chip. This is because flash memory typically only has the capability of erasing selective sections of the memory or the entire contents of the memory. Nevertheless, flash memory has several advantages over EEPROMs, including high density and the ability to operate at a low voltage. A further description of flash memories may be found in an article published in IEEE Spectrum by Pashley et al., entitled "Flash Memories: The Best of Two Worlds", December 1989. This article is hereby incorporated by reference.

With respect to the computer programs used in on-board vehicle computer systems, these computer programs can be updated or changed as discussed in Berra et al., U.S. Pat. No. 5,278,759, issued Jan. 11, 1994, entitled "System and Method for Reprogramming Vehicle Computers". This issued U.S. patent is commonly assigned and is hereby incorporated by reference. The aforementioned U.S. Pat. No. 5,278,759 discloses reprogramming non-volatile memory of one or more on-board vehicle computers through a communication link between an on-board controller and a signal transfer structure of the vehicle. This includes the use of an interface tool for communicating software to the on-board computer so as to reprogram the computer's memory in the vehicle.

Reprogramming of on-board computers is sometimes desirable to update a computer system with new routines. However, there is serious concern with the unauthorized tampering of vehicle controllers, including changes affecting vehicle operation as well as potential safety and pollution concerns. For example, unauthorized reprogramming of engine controllers can affect the engine performance and can lead to an increase the amount of pollution produced and emitted from the vehicle's engine. Also, unauthorized changes to the controls which affect the engine and transmission performance can change the way the vehicle was designed to operate as initially programmed by the vehicle manufacturer. In this regard, it has become more desirable to allow only authorized reprogramming of engine controllers with appropriate routines by qualified and trained professionals.

It is therefore desirable to provide for a reprogramming security system and method for allowing authorized reprogramming of a vehicle computer.

It is further desirable to provide for flash memory reprogramming with a security system and method that prevents unauthorized tampering and unauthorized reprogramming of an on-board vehicle computer system, while allowing authorized reprogramming.

Yet, it is also desirable to provide for a reprogramming security system and method of encrypting data for controlling access to and reprogramming of vehicle computer systems.

SUMMARY OF THE INVENTION

In accordance with the teachings of the present invention, a secured programming system and method are provided for controlling reprogramming of on-board vehicle computers. The secured programming system employs an interface tool for connecting to and communicating with a selected on-board computer system. The interface tool further communicates with an authorized database, preferably via a modem. The on-board vehicle computer contains in memory a control unit serial identification code, a series of data values and designated password A and password B. Once programmed into the on-board computer's memory, external access to the designated password A and password B is denied.

With the vehicle computer in communication with the interface tool and the authorized database, the interface tool will request the serial identification code from the on-board computer, and in response the computer will transmit the serial identification code to the interface tool from where it will be transmitted to the authorized database via the modem. The authorized database uses the serial identification code to look up a designated password A which is unique to the designated vehicle computer and transmits password A to the vehicle computer. The designated password A contains a unique message which is compared with password A stored in the vehicle computer.

If it is confirmed that password A matches the password A stored in the vehicle computer, the authorized database will formulate an encryption function as a function of password B and the series of data values and produce a series of routine output values. These routine output values are transmitted to the vehicle computer where they are deciphered based on the encryption function and password B to provide a series of deciphered data values. The deciphered data values are compared to the data values stored in the vehicle computer. If the deciphered data values match the stored data values, authorized reprogramming of control software in the engine control unit is allowed. According to the preferred embodiment, data communicated during the reprogramming of a control software is encrypted in accordance with the encryption function and designated password B throughout the reprogramming process.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
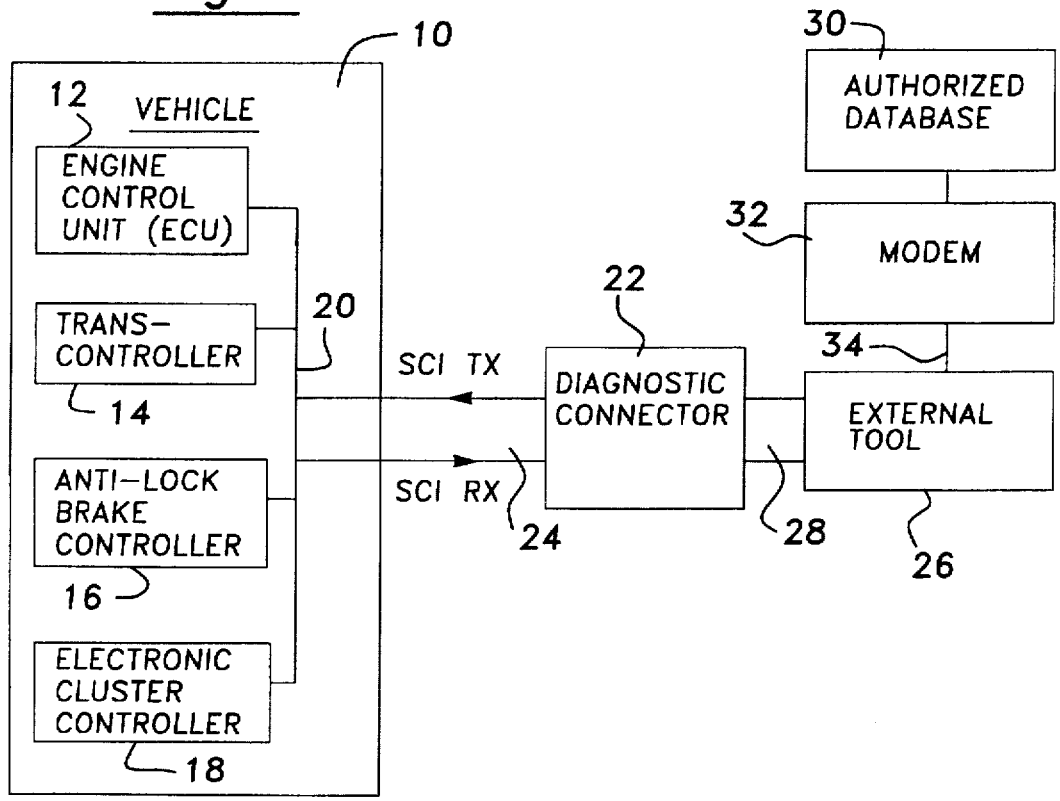
FIG. 1 is a block diagram illustrating an external tool configured to access various on-board computer systems in a vehicle to allow secured flash reprogramming of one or more of the computer systems.

Turning now to FIG. 1, a vehicle 10 is shown as a block and includes a plurality of on-board vehicle computer systems, such as an engine control unit (ECU) 12, a transmission controller 14, an anti-lock brake controller 16 and an electronic cluster controller 18. Each of these on-board vehicle computer systems or controllers are connected to a vehicle signal transfer structure 20 which could include, for example, the Chrysler Collision Detection Serial Data Bus. The vehicle signal transfer structure 20 may also include individual serial communication links to on-board vehicle computer systems that are not part of a shared or common bus structure for all on-board vehicle computer systems. In any event, it should be appreciated that a variety of suitable vehicle signal transfer structures may be employed to permit communication with various computer systems on the vehicle 10, and that the principles of the present invention are not limited to any particular vehicle signal transfer structure or control system. Additionally, while the invention is described in connection with an engine control unit 12, it should be appreciated that other suitable on-board computer systems may be reprogrammed in accordance with the reprogramming security system and method of the present invention.

In addition to the vehicle 10, also shown is a diagnostic connector 22 coupled to the engine control unit 12 via a cable structure 24 which in turn is connected to communication bus 20. According to one example, diagnostic connector 22 may include a J1962 connector, while communication bus 20 may include an SCI communication bus. The diagnostic connector 22 in turn is adapted to receive and connect to an external interface tool 26 via cable structure 28. External interface tool 26 may include any of a variety of tools which enable reprogramming of one or more on-board vehicle controllers. According to one example, external interface tool 26 may include the hand held diagnostic service tool disclosed in pending U.S. patent application Ser. No. 08/083,050, filed on Jun. 25, 1993, and entitled "Hand Held Automotive Diagnostic Service Tool". Another example of a hand held diagnostic tool may include the DRB II Diagnostic Read Out Box with a flash adapter circuit as disclosed in the above incorporated U.S. Pat. No. 5,278,759 for transmitting reprogramming signals to on-board vehicle computer systems.

The external interface tool 26 is preferably equipped with or otherwise connected to a modem 32 to allow for communication and access with an authorized database 30. The authorized database 30 may be created and maintained by a vehicle manufacture or other authorized provider and provides access control and reprogramming software for on-board computer systems. The authorized database 30 includes an encryption device such as encryption software for encrypting data that is transmitted from the authorized database 30 to remote devices through modem 32. More specifically, the encrypted data is transmitted from authorized database 30 through modem 32 to interface tool 26 and is then transmitted to the engine control unit 12 or other designated on-board computer system in vehicle 10. Provided that proprietary messages match, the encrypted data is thereafter deciphered within the engine control unit 12 or other selected computer system as is described herein.

Figure 2:
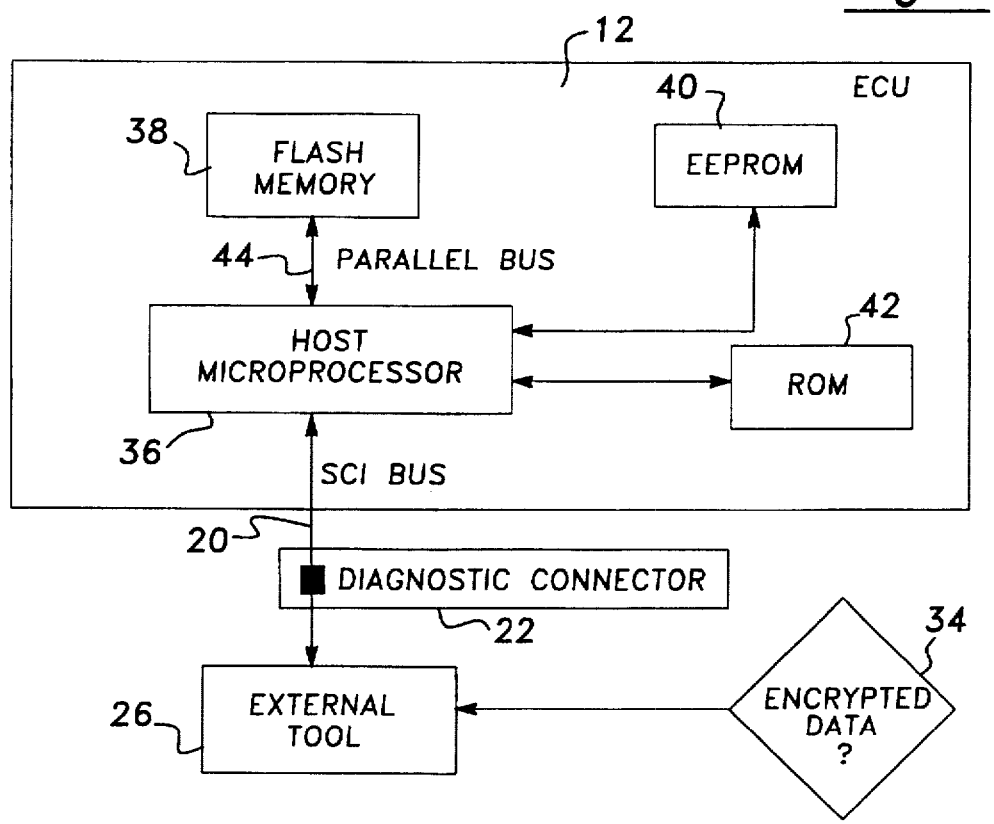
FIG. 2 is a block diagram illustrating secured reprogramming of an engine control unit in accordance with the present invention.

Referring to FIG. 2, the engine control unit 12 is shown having a host microprocessor 36, flash memory 38, electronically erasable programmable read only memory (EEPROM) 40 and read only memory (ROM) 42. The host microprocessor 36 communicates with flash memory 38 via parallel communication bus 34 and also communicates with the EEPROM 40 and ROM 42. The host microprocessor 36 further communicates with interface tool 26 via the diagnostic connector 22 and communication bus 24. While the engine control unit 12 is shown configured as provided in FIG. 2, it should be appreciated that other various arrangements of vehicle computer systems may be accessed and reprogrammed with the security reprogramming system and method of the present invention.

Figure 3:
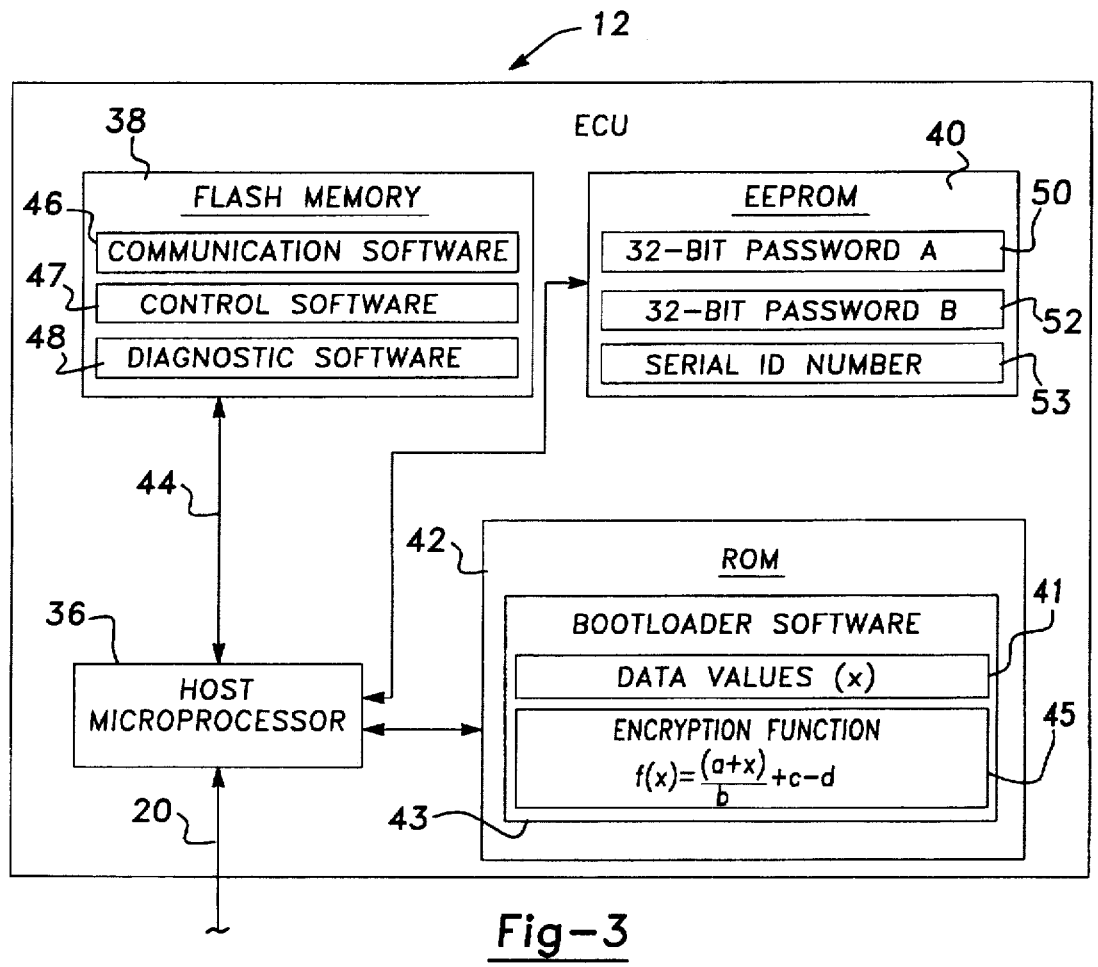
FIG. 3 illustrates various software routines that are stored in memory of the engine control unit.

With particular reference to FIG. 3, the memory within the engine control unit 12 is shown in more detail and includes various software routines. The flash memory 38 is shown containing a number of operating routines including communication software 46, control software 47 and diagnostic software 48. These software routines and other routines may be provided to control the various operations performed by the engine control unit 12 to control the engine operation in accordance with designated normal vehicle operations. Similarly, other vehicle computer systems are likewise commonly programmed with software routines to perform their intended functions. According to the present invention, the ability to access and reprogram the software stored in the flash memory 38 is controlled in a secure manner so as to allow authorized reprogramming of the data routines, while preventing unauthorized users from reprogramming the software. This ensures that the vehicle computer system of interest is controlled in accordance with authorized software routines, thereby protecting against unauthorized tampering of the normal operating routines by unauthorized users.

The EEPROM 40 of the engine control unit 12 contains a pair of designated 32-bit messages stored in the memory and referred to as password A 50 and password B 52. Password A 50 is a unique numeric code identifying that particular engine control unit. Password B 52 contains a series of variables that define values used in connection with the encryption function f(x). The engine control unit further contains a serial identification number 53 preferably stored in the EEPROM 40. The serial identification number is preferably a unique number assigned to that particular control unit. Password A 50 and password B 52 as well as serial identification number 53 are preferably programmed into the EEPROM 40 when the engine control unit 12 is initially programmed. This initial programming could be provided as the serial identification number 53 and a single 64-bit message containing both password A and password B and preferably occurs at the manufacturing facility of the engine control unit 12.

Figure 4:
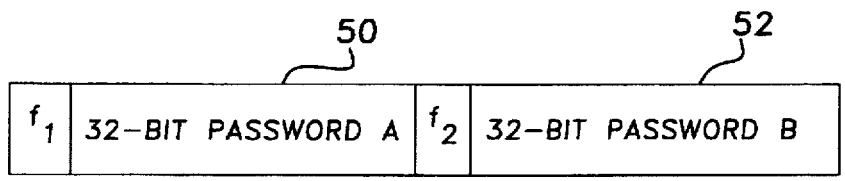
FIG. 4 further illustrates the password codes stored in EEPROM of the engine control unit according to the present invention.

The stored password A 50 and password B 52 are further shown in FIG. 4. Password A 50 and password B 52 are associated with respective flags $f_1$ and $f_2$ which indicate whether the corresponding password A 50 and password B 52 are programmed in the EEPROM 40 at the designated memory locations. Password A 50 and password B 52 are stored within EEPROM 40 at designated memory locations that are not readable by a user. This is accomplished by restricting read-out access to these locations as part of the memory access routine that is used to interrogate the engine control unit software.

The engine control unit 12 also has bootloader software 43 preferably stored in ROM 42. The bootloader software runs the operating system of the engine control unit 12. In accordance with a preferred embodiment of the present invention, bootloader software 43 contains the encryption function f(x) 45 and a series of data values (x) 41. The encryption function f(x) 45 is used for deciphering or decoding data received by the engine control unit 12 from the authorized database 30. The authorized database 30 encrypts data according to the encryption function f(x) and therefore operates as a cipher to encrypt data transmitted from the authorized database 30 to the engine control unit 12. The encryption function f(x) 45 provided in the engine control unit 12 is used in an inverse relationship to decipher data received from the authorized database 30. Accordingly, the authorized database 30 converts plaintext data to cyphertext data by encrypting the data in accordance with the encryption function f(x). The cyphertext data is transmitted through interface tool 26 to the engine control unit 12 where it is deciphered and therefore returned to plaintext data.

In accordance with one example, the encryption function f(x) may be represented by the following equation:

$$f(x) = \frac{a * x}{b} + c - d,$$

where the variables a, b, c and d are numeric values that are programmed into the encryption function in accordance with the serial data provided by password B 52. The variable x is a data value which is provided from a series of data values which are serially input into encryption function f(x) with variables a, b, c and d to generate a series of output values. Given the fact that the variables a, b, c and d as well as the series of data values provided by variable x are unknown and unaccessible to a user, one will not be able to decipher the encryption function since it is based on externally non-readable variables which are provided by data variable x and password B.

The encryption function f(x) is shown as a mathematical formula which is a function of both the variables contained in password B 52 as well as data variable x. While a specific encryption formula is shown and described herein, it should be appreciated that various encryption formulas may be employed in accordance with teachings of the present invention. It should also be appreciated that the reprogramming of software data in memory within the engine control unit 12 is encrypted in accordance with the encryption function f(x). In doing so, the downloaded data is serially input into data variable x for encryption in accordance with and thereafter deciphered to provide the downloaded data in plaintext.

Figure 5:
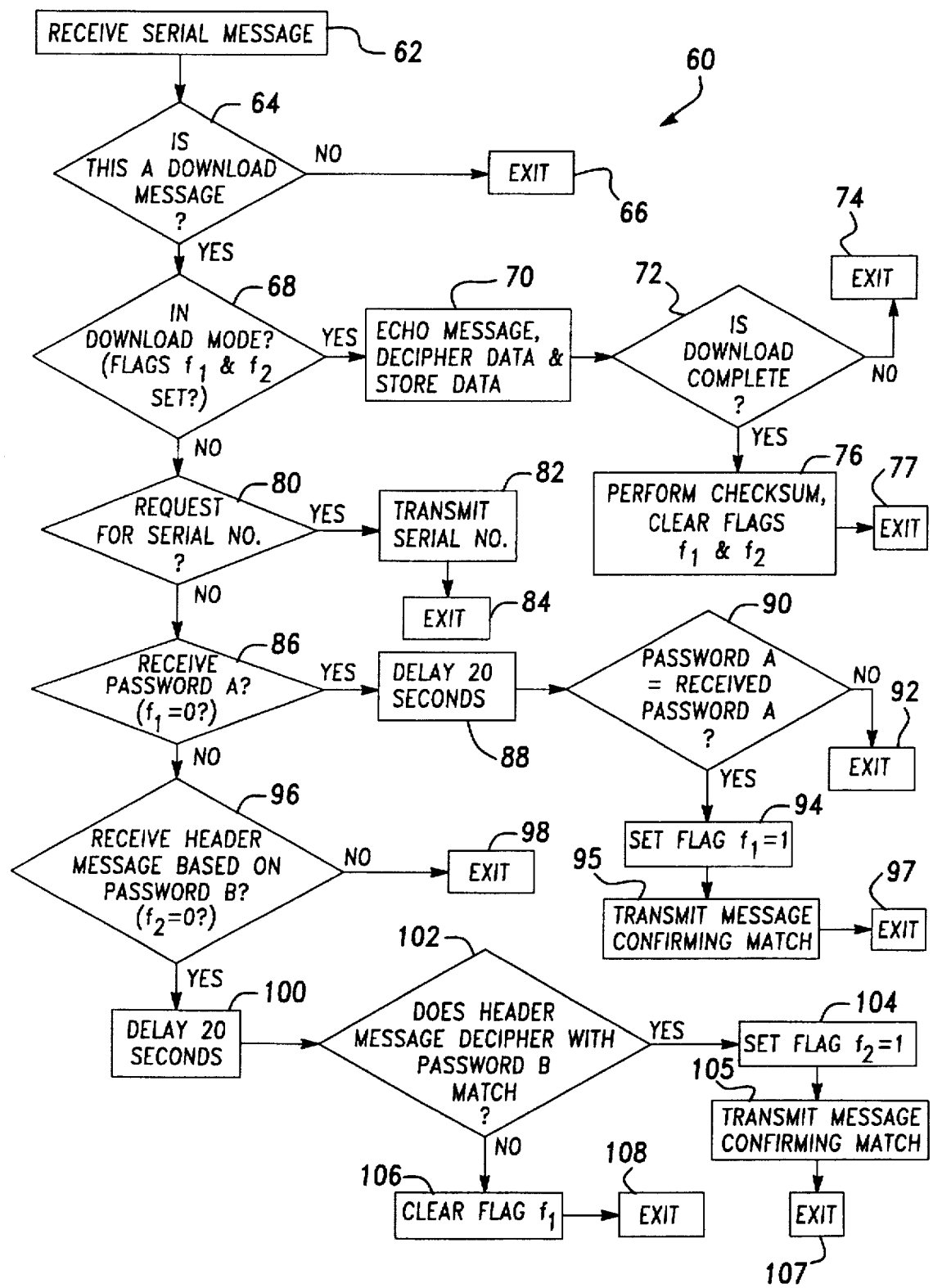
FIG. 5 is a flow diagram illustrating a methodology of performing secured flash programming of the engine control unit software according to the present invention.

Referring now to FIG. 5, a methodology 60 is illustrated for performing secured flash programming of the engine control unit software in accordance with the present invention. Methodology 60 begins with block 62 which receives a serial message. Methodology 60 checks to see if the serial message is a download message pursuant to decision block 64 and, if not, exits pursuant to block 66. If the serial message is detected as a download message, methodology 60 checks to see if it is currently in the data download mode which is indicated by both flags $f_1$ and $f_2$ being set as provided in decision block 68. The data download mode allows for downloading of data software for reprogramming of the engine control unit software. With both flags $f_1$ and $f_2$ set and therefore indicating the download mode, methodology 60 will echo the received message, decipher the data and store the data pursuant to block 70, and thereafter will check to see if the download is complete pursuant to decision block 72. If the download is not complete, methodology 60 will exit pursuant to block 74. Otherwise, with the download complete, methodology 60 will perform a checksum routine which is utilized to ensure proper data transmission and transformation from an encrypted to a deciphered state, and will also clear both flags $f_1$ and $f_2$ pursuant to block 76. Thereafter, methodology 60 exits pursuant to block 77.

Referring back to decision block 68, if both flags $f_1$ and $f_2$ are not set, decision block 80 checks for a request from the interface tool 12 for a control unit serial identification number. Once a request for the control unit serial identification number is detected, block 82 provides that the serial identification number will be transmitted to the interface tool 12 for transmission to the authorized database and thereafter will exit pursuant to block 84. If no request for a serial identification number is detected, decision block 86 provides that methodology 60 will check to see if password A has been received as indicated by flag $f_1$ being set equal to "0". If password A has been received, methodology 60 will delay twenty seconds pursuant to block 88 and thereafter check to see if password A as stored in the engine control unit 12 is equal to the received password A and, if not, will exit pursuant to block 92. Provided that password A as stored in the engine control unit 12 is equal to the received password A, methodology 60 will proceed to block 94 to set flag $f_1$ equal to "1". Thereafter, methodology 60 will transmit an acknowledgement message to confirm the match provided in block 95 and then exit pursuant to block 97.

If password A has not been received, decision block 96 provides that methodology 60 will check to see if a header message has been received based on password B as indicated by flag $f_2$ being set equal to "0". If not, methodology 60 exits pursuant to block 98. Otherwise, if the header message is received as indicated by flag $f_2$ set equal to "0", methodology 60 will proceed to delay twenty seconds pursuant to block 120 and thereafter will check to see if the received header message deciphers with a password B match as provided by decision block 102. If a match between the header message containing data values as stored in the engine control unit 12 and the received deciphered data values is reached, methodology 60 will set flag $f_2$ equal to "1" pursuant to block 104. Thereafter, methodology 60 will transmit an acknowledgement message confirming the match as provided in block 105 and will exit pursuant to block 107. Accordingly, once both flags $f_1$ and $f_2$ are set, data downloading may occur as described above in connection with blocks 68–74. Otherwise, if the data values as stored in the engine control unit 12 do not match the deciphered data values as received, methodology 60 will proceed to clear flag $f_1$ pursuant to block 106 and thereafter exit pursuant to block 108. It should be appreciated that the downloaded data is preferably encrypted via password B throughout the continued downloading process and that the engine control unit 12 will use the encryption function $f(x)$ and password B to decipher the downloaded data before it stores any such data in memory.

In operation, the flash programming security of the present invention provides reprogramming of vehicle computer systems for authorized users while ensuring that the programming software may not be tampered with due to unauthorized programming. In doing so, a tool such as external interface tool 26 is connected to the vehicle communication bus to communicate with one or more computer systems on the vehicle 10 via a diagnostic connector 22. The interface tool 26 in turn communicates via a modem 32 with an authorized database 30. Once the interface tool 12 provides communication between a designated computer system such as engine control unit 12 and the authorized database, the interface tool 26 will request the serial identification number from the computer system. In response, the designated computer system will transmit the control unit serial identification number to the interface tool 26 which in turn sends the serial identification number to the authorized database 30. Within the authorized database 30, the control unit serial identification number will be used to look up a designated password A which is unique to the designated computer system on vehicle 10. The looked up password A is transmitted to the computer system and compared with a password A stored therein. If a match occurs, a confirmation message is sent to the authorized database 30.

The designated password B contains information for defined variables for use in the encryption function $f(x)$ to encrypt data transmitted from the authorized database. The authorized database 30 will output a series of routine output values based on the input data values x and password B as determined by the encryption function $f(x)$. The routine output values are then transmitted to the given computer system. The on-board computer system will decipher the encrypted data and compare the deciphered plaintext data to data values stored therein. If the deciphered data values match the stored data values, authorized reprogramming of control software in the engine control unit or other given computer system is thereafter allowed. Furthermore, the reprogramming software data communicated to the given computer system is continually encrypted in accordance with the encryption function and designated password B throughout the reprogramming process. The security of the download process disallows unauthorized data from being downloaded to the vehicle computer system.

The requirement of a time delay between attempts to decipher messages received for both password A and password B ensures that an unauthorized attempts to reprogram cannot be performed with rapid message transmittals in an attempt to randomly check for the encryption and message passwords by the process of trial and error.

Accordingly, the present invention provides an encryption function and data messages which are intended to be externally nonaccessible and therefore not readable to unauthorized users, yet the encryption function and data messages are readable within the engine control unit 12 to determine if encrypted data as provided from an authorized database matches the information stored within the engine control unit 12. This ensures that any reprogramming of software routines within the engine control unit 12 only occurs when a proper match has been determined. Accordingly, only authorized reprogramming of the software routines may be realized. This advantageously prevents unauthorized attempts of reprogramming the software routines for controlling a specific on-board computer system of a vehicle, such as the engine control unit for controlling the engine of vehicle 10. The present invention may prevent undesirable or unintended programming of vehicle controls which could otherwise lead to potentially adverse affects on performance of the vehicle 10.

While a specific embodiment of the invention has been shown and described in detail to illustrate the principles of the present invention, it should be understood that the present invention may be embodied otherwise without departing from such principles. For example, one skilled in the art will readily recognize from such discussion and from the accompanying drawings that various changes, modifications and variations can be made therein without departing from the spirit and scope of the present invention as described in the following claims.

What is claimed is:

1. A system for providing secured programming of one or more on-board vehicle computers, said system comprising:

an identification code stored in memory of a programmable vehicle computer;

a first password message stored in memory of the programmable vehicle computer;

a second password message stored in memory of the programmable vehicle computer;

a database containing programming software for programming the programmable vehicle computer, said database further providing a first password message corresponding to the identification code and a second password message;

encryption means for encrypting communication data in accordance with an encryption function and based on values provided by said second password message and a series of data values;

an interface device for communicating between the database and the programmable vehicle computer;

control means within the vehicle computer for deciphering received encrypted messages and generating deciphered data values as a function of the password message; and means for allowing reprogramming of the software in the programmable vehicle computer when the deciphered data values match the stored data values in the programmable vehicle computer.

2. The system as defined in claim 1 wherein said first password message is provided by looking to a look-up table based on the identification code.

3. The system as defined in claim 1 wherein said identification code is unique to said vehicle computer.

4. The system as defined in claim 1 wherein said programming comprises flash programming of flash memory.

5. The system as defined in claim 1 further comprising a telecommunication modem coupled between the interface tool and the database.

6. A method of programming a programmable vehicle computer, said method comprising the steps of:

storing a first password code containing a series of first values in memory of the vehicle computer;

storing a series of data values in memory of the vehicle computer;

communicating with the vehicle computer and a database;

encrypting a series of data values as a function of the first values of the first password code to generate encrypted output values;

transmitting the encrypted output values to the vehicle computer;

deciphering the encrypted output values in accordance with the stored password values to generate received data values;

comparing the deciphered data values with the stored data values; and allowing reprogramming of software of the vehicle computer if the deciphered data values match the stored data values.

7. The method as defined in claim 6 further comprising the steps of:

storing an identification code in memory of the programmable vehicle computer;

transmitting the identification code to the database;

looking up a second password code which corresponds to the identification code received at the database;

transmitting the second password code from the database to the vehicle computer; and comparing the received password code with a password code stored in memory of the programmable vehicle computer.

8. The method as defined in claim 7 wherein said identification code is unique to said vehicle computer.

9. The method as defined in claim 6 further comprising the step of communicating between the vehicle computer and the database via an interface device.

10. The method as defined in claim 9 further comprising communicating between the interface device and the database via a telecommunication modem.

11. The method of providing secured programming of a programmable vehicle computer, said method comprising the steps of:

transmitting an identification code from a selected vehicle computer to an authorized database;

determining a first password code which corresponds to the identification code received at the database;

transmitting the first password code from the database to the vehicle computer;

comparing the received first password code with a first password code stored in memory of the programmable vehicle computer;

encrypting a series of data values as a function of an encryption function and a second password message;

transmitting the encrypted data to the vehicle computer;

deciphering the encrypted data as a function of a stored encryption function and a stored second password to provide deciphered data values;

comparing the deciphered data values with stored data values in memory of the programmable vehicle computer; and allowing reprogramming of software of the vehicle computer system if the deciphered data values match the stored data values.

12. The method as defined in claim 11 wherein the step of allowing reprogramming further requires that the received first password code match the stored first password code.

* * * * *